United States Patent
Sundgren et al.

(10) Patent No.: US 6,726,258 B1
(45) Date of Patent: Apr. 27, 2004

(54) BUMPER BAR

(75) Inventors: Anders Sundgren, Sunderbyn (SE); Mats Lindberg, Luleå (SE); Göran Berglund, Gammelstad (SE)

(73) Assignee: Accra Teknik AB, Öjebyn (SE)

( * ) Notice: Subject to any disclaimer, the term of this patent is extended or adjusted under 35 U.S.C. 154(b) by 0 days.

(21) Appl. No.: 10/149,454

(22) PCT Filed: Nov. 23, 2000

(86) PCT No.: PCT/SE00/02307

§ 371 (c)(1),
(2), (4) Date: Jul. 22, 2002

(87) PCT Pub. No.: WO01/44017

PCT Pub. Date: Jun. 21, 2001

(30) Foreign Application Priority Data

Dec. 14, 1999 (SE) .............................. 9904567

(51) Int. Cl.$^7$ ............................... B60R 19/02
(52) U.S. Cl. ........................................ 293/102
(58) Field of Search ................ 293/102, 120, 293/121, 122

(56) References Cited

U.S. PATENT DOCUMENTS

| | | | |
|---|---|---|---|
| 1,614,087 A | * 1/1927 | Shaw | 293/102 |
| 3,698,224 A | 10/1972 | Saytes | 72/178 |
| 4,116,480 A | * 9/1978 | Crestetto | 293/102 |
| 4,597,601 A | 7/1986 | Manning | 293/122 |
| 4,652,032 A | 3/1987 | Smith | 293/120 |
| 5,080,412 A | 1/1992 | Stewart et al. | 293/155 |
| 5,340,178 A | 8/1994 | Stewart et al. | 293/122 |
| 5,425,561 A | 6/1995 | Morgan | 293/120 |
| 5,462,325 A | 10/1995 | Masuda et al. | 293/102 |
| 5,498,045 A | 3/1996 | Morgan et al. | 293/122 |
| 5,577,796 A | 11/1996 | Clausen | 296/202 |
| 5,603,541 A | 2/1997 | Wada et al. | 293/102 |
| 5,803,517 A | 9/1998 | Shibuya | 293/120 |
| 5,997,057 A | 12/1999 | Gasko et al. | 293/102 |
| 5,997,058 A | 12/1999 | Pedersen | 293/102 |
| 6,000,738 A | 12/1999 | Stewart et al. | 293/102 |
| 6,042,163 A | 3/2000 | Reiffer | 293/155 |
| 6,082,792 A | 7/2000 | Evans et al. | 293/133 |
| 6,352,297 B1 | 3/2002 | Sundgren et al. | 293/102 |

FOREIGN PATENT DOCUMENTS

| | | |
|---|---|---|
| DE | 196 00 533 A1 | 7/1997 |
| EP | 0426565 | 5/1991 |
| EP | 0449599 | 10/1991 |
| JP | 6 247237 | 9/1994 |
| WO | WO 95/20506 A1 | 8/1995 |

* cited by examiner

*Primary Examiner*—D. Glenn Dayoan
*Assistant Examiner*—Paul Chenevert
(74) *Attorney, Agent, or Firm*—Ware, Fressola, Van der Sluys & Adolphson LLP

(57) ABSTRACT

A vehicle is subjected to many requirements and wishes. One of these is that the vehicle is to protect passengers and load during a collision. This is achieved in that different parts in and on the vehicle are designed and constructed such that they, in different ways, absorb, distribute and channel energy during a collision. A bumper bar for a vehicle must be deformed both elastically and/or plastically during a collision. This invention offers a bumper bar that in its basic construction provides these properties. The invention concerns a bumper bar for vehicles where the bar is extended and has a closed cross-section with at least one forward flange (1) facing forwards in the normal direction of motion of the vehicle, an upper web (3) and a lower web (4). The forward flange (1) of the bumper bar is provided with elastically deformable grooves (6).

5 Claims, 1 Drawing Sheet

BUMPER BAR

BACKGROUND OF THE INVENTION

1. Technical Field

This invention concerns a bumper bar for vehicles.

2. Description of the Background Art

A completed vehicle is subject to many requirements and wishes. One of these is that the vehicle is to protect passengers and load during a collision. This is achieved in that different parts in and on the vehicle are designed and constructed such that they in different ways absorb, distribute and channel energy during a collision.

If the transfer of energy from a collision object to the vehicle is limited, for example, if the vehicle collides with a collision object at low speed, the parts must principally absorb and distribute the forces such that as little change of shape of the vehicle and its parts occurs as possible. It is most preferable if the change of shape is only temporary, something that is known as "elastic deformation".

If the transfer of energy from the collision object to the vehicle is large, as occurs, for example, if the vehicle collides with a collision object at high speed, the energy-absorbing parts must absorb and distribute the forces in such a way that the energy is used in a controlled manner as far as this is possible; by using the energy, for example, for the demolition of certain predetermined parts of the vehicle that have been constructed for this purpose and that can be easily replaced after the collision. This is normally called "plastic deformation".

The vehicle must also have a shape that gives the desired driving properties, external and internal dimensions and spaces. The vehicle must also have an appearance that corresponds to the wishes and expectations of the customers. There are often conflicts between the traffic safety of a vehicle and its design. Small, fast and from the point of view of design minimal vehicles attract more buyers than larger vehicles possessing several and more than adequate safety zones.

Increased demands for traffic safety have resulted in a modified basic construction of bumper bars. It is now common for the bar to have a closed cross-section. This shape of the bar results in the bumper bar absorbing collision forces and torsional loads and distributing strains in an optimal manner. The beam is primarily constructed for plastic deformation. The external dimensions of a bar with this construction become relatively large and the bar requires considerable space.

Previously known bumper bars are coated with at least one layer of material that makes the elastic deformation possible. The layer of material is soft and pliable such that collisions at low speed only result in an indentation. The layer of material where the indentation has occurred must subsequently spring back and return to its original shape. The layer of material often include plastics in the form of foamed polymers or similar. Other contributory materials and further layers are often used in addition to this in order to give stability, a protective surface, attractive appearance and other properties.

One problem with a bumper bar with such a layer of material is that the bar becomes voluminous. The layer of material must be relatively thick if it is to fulfill its function, and this involves a further increase in the size of the bumper bar.

Another problem with such a bumper bar is that it is expensive. The layer of material is expensive in itself, and the handling of the material and the bar during manufacture of the bar and the subsequent manufacture of the vehicle is expensive.

Further problems are that the layer of material normally exposed to the weather and the surroundings and tends to age before other parts of the vehicle. A layer of material that is damaged in a collision is difficult or impossible to repair which means that even if the bar is otherwise intact, the bar must be demounted and provided with a new layer of material. This involves further expense.

SUMMARY OF THE INVENTION

This invention solves these problems and offers a bumper bar with a basic construction that results in that the bar can be deformed elastically and/or plastically during a collision. According to the invention, a bumper bar is longitudinally extended and has an upper web, a lower web and a flange directed forwards in the normal direction of the vehicle. The flange is provided with grooves that are elastically deformable.

Figure 1:
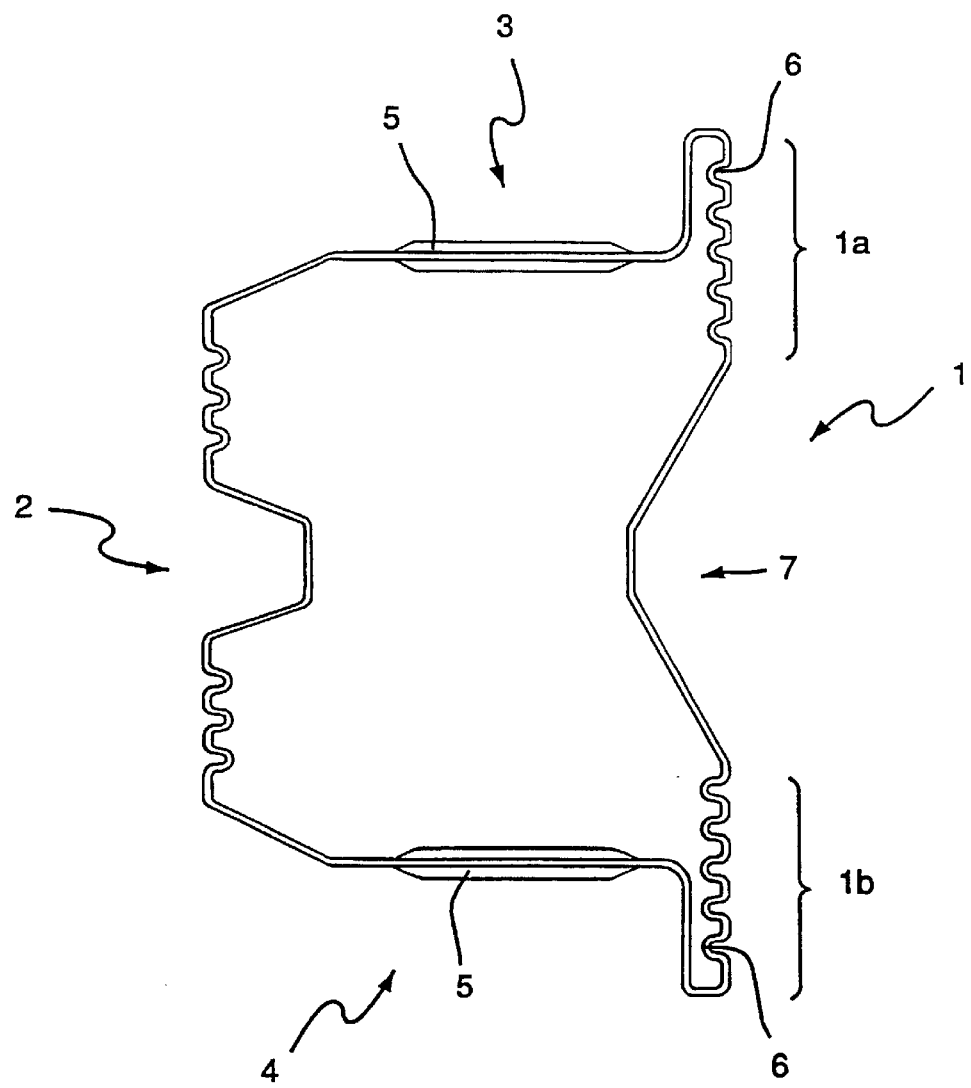
FIG. 1 shows a bumper bar according to the invention in section perpendicular to the long axis of the bar.

The bumper bar is to be mounted horizontally at the front end of a vehicle, on the front ends of side beams (not shown in the drawing since these have no significance for this invention) arranged on each side of the vehicle. The mounting of the bumper bar onto the side beams can occur in a freely chosen manner. When the bumper bar has been mounted onto the vehicle its principal function is to receive, distribute, spread and guide the energy that is transferred between an object and the vehicle during a collision. The bar must primarily capture those forces during a collision that acts on the vehicle directly from the front or obliquely from the front. In the description that follows, the front end of the vehicle will constitute a direction indicator. The word "forwards" denotes the direction in which the vehicle normally travels and "backwards" denotes the opposite direction.

The bar according to the embodiment is made from sheet metal; steel would be a suitable material. Boron steel gives good results and is economically advantageous. The bar is extended and has the form of a tube with a closed cross-section. The bar comprises a forward flange 1, a rear flange 2, an upper web 3 and a lower web 4. The flanges 1 and 2 and the webs 3 and 4 constitute parts of one and the same piece of material and form the principal limiting surfaces of the bar. The forward flange 1 is directed forwards in the direction of motion of the vehicle when the bar is mounted and constitutes the first contact surface between the vehicle and the collision object. The rear flange 2 makes it possible to attach the bar at the front ends of side bars on the vehicle. The webs 3 and 4 may be provided with bends, grooves or other similar designs 5 in the material that lie transverse to the longitudinal axis of the bar, which affect the properties of the bar with respect to, among other factors, the design of the bar and the plastic deformation.

The forward flange 1 is wholly or partially provided with grooves 6 that lie along the bar. These grooves 6 are small, they are known as microgrooves or microbends, and many, which means that the bar has a large amount of material in this forward flange 1. The longitudinal grooves 6 extend over the complete length of the bar. The forward flange 1 comprises two parts 1a and 1b that lie along the bar and that constitute those parts of the bar that, when the bar is mounted on a vehicle, are situated at the front and that will meet first a collision object. The forward flange 1 further comprises a channel-shaped depression 7 lying along the bar that is directed in towards the interior of the bar and that is formed in the flange material between the two longitudinal parts 1a and 1b. The two longitudinal parts 1a and 1b are provided with longitudinal microgrooves 6 that cover their complete surfaces.

In a collision in which transfer of energy from the collision object to the vehicle is limited, the material in the forward flange will behave in an elastic manner. The forces of collision will be absorbed and spread though the material in the grooves 6. The forces of collision are distributed over the grooves 6 and transported along these. The forward flange 1 and its grooves 6 will regain their original shape and will not be significantly changed in shape.

The grooves 6 behave in the same manner as the previously applied layer or layers of material. The grooves 6 on the forward flange of the bumper bar replace wholly or partially the layer of material with which bumper bars have previously been coated. Some form of outer coating for the bar or a thin energy-absorbing layer of material may still be required but the costs will still be significantly reduced. The grooves 6 are constructed during the shaping process that otherwise forms the bar through one or more extra steps, for example, during a roll-forming or pressing process. This manufacture will be rapid and cost-effective.

The grooves 6 also have a supporting function. The bar becomes stiffer in the longitudinal direction due to the grooves 6.

It is fully possible within the concept of invention to have other solutions and detailed designs of certain parts of the bar. The number, appearance and construction of the grooves and bends may be varied and supplemented in order to control and vary the collision properties of the bar. This description is not to be seen as a limitation of the invention, but is rather to be seen as a guide to full understanding of the invention in all of its parts.

What is claimed is:

1. Longitudinally extended bumper bar for a vehicle comprises an upper web, a lower web, a rear flange and a front flange, all of formed sheet metal material which together form an essentially closed cross-section, the front flange being directed forwards in a normal direction of motion of the vehicle and provided with microbends so that the front flange behaves in an elastically deformable manner during a collision in which there is a transfer of energy from a collision object to the vehicle.

2. Bumper bar according to claim 1, wherein the microbends lie along the front flange in a longitudinal direction of the bar.

3. Bumper bar according to claim 2, wherein the microbends that lie along the bar cover the complete length of the bar.

4. Bumper bar according to claims 1, wherein the front flange comprises at least two parts that lie along the bar and a channel-shaped depression that lies along the bar, the channel-shaped depression is directed in towards an interior of the bar, and is shaped between the two parts that lie along the bar.

5. Bumper bar according to claim 4, wherein the at least two parts that lie along the bar are provided with the microbends, the microbends lie along the bar over substantially complete surfaces of the at least two parts.

* * * * *